3,689,485
PROCESS FOR THE PREPARATION OF 3,4-DIHYDRO-1,2,3-OXATHIAZIN-4-ONES

Karl Clauss, Eppenhain, Taunus, and Gerhard Lohaus, Kelkheim, Taunus, Germany, assignors to Farbwerke Hoechst Aktiengesellschaft vormals Meister Lucius & Bruning, Frankfurt am Main, Germany
No Drawing. Filed Jan. 7, 1971, Ser. No. 104,794
Claims priority, application Germany, May 21, 1970, P 20 24 694.0
Int. Cl. C07d 95/00
U.S. Cl. 260—243 R                 2 Claims

ABSTRACT OF THE DISCLOSURE 3,4-dihydro-1,2,3-oxathiazinones are obtained when reacting ketones with aryloxysulfonyl isocyanates. The compounds having low-molecular substituents are artificial sweetening agents and the derivatives having hydrophobic substituents are interfacial active agents. All of the new compounds are organic intermediates having a plurality of reactive groups.

---

The present invention relates to a process for the preparation of a new class of chemical compounds having a hitherto unknown ring system. More specifically, it relates to a process for the preparation of 3,4-dihydro-1,2,3-oxathiazin-4-ones from ketones and aryloxy sulfonyl isocyanates.

In our copending application of Karl Clauss and Harold Jensen, Ser. No. 104,795, filed Jan. 7, 1971, we already described and claimed the new 3,4-dihydro-1,2,3-oxathiazin-4-ones and some processes for their preparation, said processes starting from fluorosulfonyl isocyanate and a compound of the formula $$R_1-A-R_2$$

in which $R_1$ represents a hydrogen atom, an optionally branched alkyl group having from 1 to 20, preferably up to 10, carbon atoms, an aromatic hydrocarbon radical having up to 10 carbon atoms, $R_2$ stands for an optionally branched alkyl group having up to 20, preferably up to 10 carbon atoms, or an aromatic hydrocarbon radical having up to 10 carbon atoms, and in which $R_1$ and $R_2$ may also be linked to form an isocyclic ring which optionally may be substituted by further hydrocarbon radicals, and A represents a group of the formulae

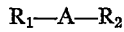

$-CH_2-CO-$, $HOOC-\overset{|}{C}H-CO-$ or $-C\equiv C-$

It now has been found that a compound of the formula

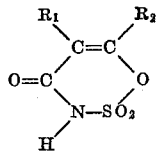
    I in which $R_1$ and $R_2$ are as defined above, is also obtained when reacting a compound of the formula $$R_1-CO-CH_2-R_2$$

in which $R_1$ and $R_2$ are as defined above, with a compound of the formula $$R-O-SO_2-NCO$$

in which R represents a benzene nucleus, optionally substituted by alkyl groups having up to 4 carbon atoms, by halogenes, pseudo-halogenes or nitro groups, and treating the so-obtained β-ketocarboxylic acid amide-N-sulfone As sulfonyl-isocyanates of the Formula

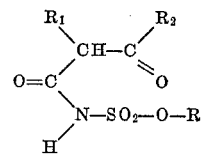

in which R, $R_1$ and $R_2$ are as defined above, with bases in the presence of water, so that the mixture attains a pH of 5 to 12 and isolating the oxthiazinone of the Formula I thus obtained.

As sulfonyl-isocyanates of the Formula $$R-O-SO_2NCO$$

aryloxysulfonyl-isocyanates are used, such as they are obtained from aromatic hydroxy compounds and chlorosulfonyl-isocyanate according to German Pat. No. 1,230,017. Thus, besides the phenoxysulfonyl-isocyanate most easily obtainable also such phenoxysulfonyl-isocyanates are used which may contain 1, 2 or 3 substituents at the phenyl nucleus, such as alkyl groups having from 1 to 4 carbon atoms, for example methyl, ethyl, propyl, isopropyl, butyl and/or isobutyl groups, furthermore halogen atoms, for example fluorine, chlorine and/or bromine, pseudo-halogenes, such as cyano or thiocyano and/or nitro groups, for example 4-methyl-, 4-chloro-, 2,4,6-trichloro- or 4-cyano-phenoxysulfonyl-isocyanate. The substituents at the phenyl nucleus may be equal or different. As to profitability of the process, the kind of substitution at the phenoxy group is of no importance, since according to the process of the invention the phenols split off later may be recovered and used again.

When preparing the oxathiazinone derivatives by the method as described above, the reaction proceeds via the intermediate step of the substituted N-(aryloxysulfonyl)-β-keto-acid amides which, either as pure compounds or in the form of the reaction mixtures formed during their synthesis, are converted into the oxathiazinones by means of bases in the presence of water. As by-products, phenols are forming:

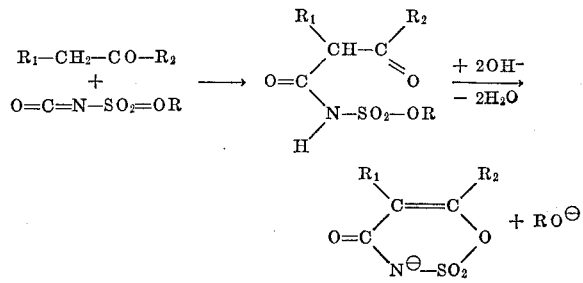

According to this reaction equation, 2 equivalents of base per mol of β-ketocarbamido-N-sulfone compound are required. An excess of base is not detrimental because of the stability of the oxathiazinone ring to alkaline hydrolysis.

The saponification and ring formation proceeds at temperatures of from about +5° and about 85° C., preferably of from about 20 to about 60° C. The optimum temperature regarding reaction speed and heat requirements depends on the substituents $R_1$, $R_2$ and $R_4$ and may be easily determined by preliminary tests.

Isolation of the oxathiazinones from the aqueous solution of their salts is carried out according to normal methods. After acidification, mixtures of the oxathiazinones with the phenols formed as by-products are obtained. Besides the usual separation methods of crystallization or distillation in vacuo, the highly acidic nature of the oxathiazinones is very helpful in their separation. They dissolve already in hydrogen carbonate solutions, such as solutions of $NaHCO_3$ or $KHCO_3$, and they may thus be separated from the less acidic phenols in the form of their alkali metal salts. The phenols may be obtained for example by means of 2 N alkali metal hydroxide solutions and then used again for the preparation of aryloxysulfonyl-isocyanates. Thus, an advantageous circulation process is brought about which ensures the preparation of the oxathiazinone derivatives using chlorosulfonyl-isocyanate and phenols as adjuvant to be recovered at any time. By this new operation mode the formation of waste water containing great amounts of fluorine is avoided, as this is the case in the processes using fluorosulfonyl-isocyanate.

The new compounds are thermically and chemically stable crystalline substances which are soluble in usual organic solvents and, at low substitution degree, also in water. They are strong monobasic acids—also the water-insoluble substances are soluble in dilute aqueous lyes—and from stable salts with organic and inorganic bases, for example ammonia, with primary, secondary and tertiary amines, for example triethanolamine. The salts with sodium, potassium, magnesium and calcium are thermically very stable compounds having melting points above 250° C., which easily dissolve in water reacting neutrally.

A great number of the new compounds has a sweet taste in the free acid form as well as in the form of their neutral salts. This sweetening effect is distinctive especially in the case of such compounds which, according to the general Formula I, possess as substituent $R_1$ a hydrogen atom or an alkyl radical having up to 4 carbon atoms and as substituent $R_2$ an alkyl radical having up to 4 carbon atoms, $R_1$ and $R_2$ together possessing less than 6 carbon atoms. Some of these substances are distinguished by their especially pure sweetness without any metallic or bitter aftertaste. These compounds are the 6-methyl- and the 5,6-dimethyl-3,4-dihydro-1,2,3-oxathiazin-4-one-2,2-dioxide, both of which are about 200 fold sweeter than cane sugar, as well as the 5-ethyl-6-methyl-analogue which is about 500 fold sweeter than cane sugar. Since the free acids are not suitable in all cases because of their acidity, their non-toxic salts, especially the sodium, potassium and calcium salts are preferred as sweetening substances.

As such oxathiazinone-dioxides, the following examples may be cited:

6-methyl-, 6-ethyl-, 6-propyl-, 6-iso-propyl-, 6-n-butyl-, 6-iso-butyl- and 6-tert.-butyl-3,4-dihydro-1,2,3-oxathiazin-4-one-2,2-dioxide, 5,6-dimethyl-, 5-methyl-6-ethyl-, 5-methyl-6-n-propyl-, 5-methyl - 6 - isopropyl- and 5-methyl-6-n-butyl-3,4-dihydro-1,2,3-oxathiazin-4-one-2,2-dioxide, 5-ethyl-6-methyl-, 5-ethyl-6-n-propyl-, 5-propyl-6-methyl-oxathiazin-4-one-2,2-dioxide.

Furthermore, the new compounds of Formula I, on account of their polar properties, may be used as dissolving agents, and inasmuch as the radicals $R_1$ and $R_2$ are alkyl radicals having a longer chain, these compounds are interfacial agents or surfactants and thus may be used as wetting, foaming or dispersing agents, emulsifiers etc. according to the kind of their substituents. For these purposes, above all the long-chain derivatives, preferably in the form of their alkali metal, alkaline earth metal or ammonium salts, especially as sodium salts, may be used.

Since the new ring system possesses a great number of reactive centres, for example the $SO_2$ group as ring forming element, the new compounds show a certain analogy to the derivatives of sulfuric acid, above all to the sulfonic acids, sulfonamides and sulfuric acid esters. This analogy is showing especially in the polar properties of the new compounds. From this analogy result also further special applications of the compounds, on the one hand as interfacial agents, on the other as intermediate products for organic syntheses, for example for the preparation of medicaments. On account of all other reactive groups of these new compounds, there is quite a number of further uses possible as the expert will know.

The following examples illustrate the invention.

EXAMPLE 1

Reaction product of butanone-(2) and phenoxy-sulfonylisocyanate 200 ml. of butanone-(2) (2.24 mols) were mixed slowly with 100 ml. (137 g., 0.69 mol) of phenoxysulfonyl-isocyanate, while the temperature was rising to 45° C. The reaction was allowed to complete overnight, and the excess butanone was then distilled off in vacuo. From the residue solidified to crystals 94 g. of fine clogging needles having a melting point of 74–75° C. (50% of the theoretical yield) were obtained after recrystallization from chloroform/propyl chloride.

$C_{11}H_{13}NO_5S$ (271.3):
 Calc.: C, 48.6; H, 4.8; S, 11.8
 Found: C, 48.3; H, 4.9; S, 11.6
Molar weight: 271 (mass spectrum)
NMR spectrum (acetone-$d_6$):
 1.3 p.p.m. (d., J=7.5 Hz.) $\underline{CH_3}$—H
 2.17 p.p.m. (s.) $\underline{CH_3}$—C=O
 abt. 3.8 p.p.m. (q., J=7.5 Hz.) $CH_3$—$\underline{CH}$
 abt. 7.4 p.p.m. (m.) $C_6\underline{H_5}$
 abt. 11.0 p.p.m. (s.) —$\underline{NH}$—$SO_2$
IR spectrum:
 ($CH_2Cl_2$) 3.0μ (NH), 5.8μ (C=O), 5.9μ (C=O)
 (KBr) 2.95μ (NH), 5.75μ (C=O), 5.93μ (C=O)

According to the above analysis values, the product was N-(phenoxy-sulfonyl)-α-methyl-aceto-acetic acid amide.

Saponification 81 g. of crystalline N-(phenoxysulfonyl)-α-methyl-aceto-acetic acid amide (0.3 mol) having a melting point of 74–75° C. were dissolved in 350 ml. of 2 N NaOH, and the solution was maintained for 7 hours at 55–60° C. After cooling, possible impurities were eliminated from the alkaline solution by extraction with ether, and the solution was then acidified with 75 ml. of concentrated HCl. Complete extraction with methylene chloride yielded a mixture of phenol and the strongly acidic 5,6-dimethyl - 3,4 - dihydro-1,2,3-oxathiazin-4-one-2,2,dioxide. For separation purposes, the methylene chloride solution was extracted with 30 g. of sodium hydrogen carbonate in 200 ml. of water and subsequently with 150 ml. of 2 N NaOH. Thus, 37 g. (70% of the theoretical yield) of oxathiazinone derivative and 15 g. of phenol having a melting point of 41° C. (55% of the theoretical yield) were obtained. Both the products were identified by establishing the mixed melting point and comparison of the IR spectra. The purity of the oxathiazinone derivative was controlled by gas chromatography on a polyphenyl ether separation column (70–250° C.) (as solution in chloroform).

EXAMPLE 2

Reaction product of butanone-(2) and 2,4,6-trichlorophenoxy-sulfonyl-isocyanate 50 ml. (81.8 g., 0.27 mol) of 2,4,6-trichloro-phenoxysulfonyl-isocyanate having a boiling point of 108° C. at $10^{-3}$ torr were added dropwise to 100 ml. (80.5 g., 1.12 mols) of butanone-(2), while weakly cooling, and the reaction was allowed to complete overnight. The excess butanone was distilled off in vacuo and the residue was recrystallized with cooling from propyl chloride. 67 g. (0.18 mol) of a colourless crystal powder having a melting point of 101–103° C. were obtained. According to NMR and IR spectra it was the N-[2,4,6-trichloro phenoxy-sulfonyl] - α - methylaceto-acetic acid amide. Yield: 67 g. (0.18 mol)=66% of the theoretical yield.

NMR spectrum (CDCl₃):
  1.48 p.p.m. (d., J=7.5 Hz) C$\underline{H}_3$—CH
  2.3 p.p.m. C$\underline{H}_3$—C=O
  abt. 3.7 p.p.m. (q., J=7.5 Hz) CH₃—C$\underline{H}$
  7.4 p.p.m. (s.) 2 H, aromatic
  abt. 10.3 p.p.m. (s.) —N$\underline{H}$—SO₂—
IR spectrum (CH₂Cl₂): 3.0μ (NH), 5.75μ (C=O), 5.85μ (C=O)

Saponification 75 g. (0.2 mol) of the powder described above having a melting point of 101–103° C. were combined in different portions with 200 ml. of 2 N NaOH (0.4 mol), and stirred for 3 hours at 35° C. Subsequently, the whole was acidified with 40 ml. of concentrated HCl and extracted with methylene chloride. From the methylene chloride solution, the strongly acidic 5,6-dimethyl-3,4-dihydro-1,2,3-oxathiazin-4-one - 2,2 - dioxide (32 g.=0.18 mol, 90% of the theoretical yield) having a melting point of 105–107° C. was obtained by stirring with 20 g. of sodium hydrogen carbonate and 200 ml. of water. Subsequently, 35 g. (0.176 mol, 88%) of 2,4,6-trichlorophenol having a melting point of 67–69° C. were obtained by extraction with 2 N NaOH. Both products were identified by establishing the mixed melting point and comparison of the IR spectra.

EXAMPLE 3

Preparation of 5,6-dimethyl-3,4-dihydro-1,2,3-oxathiazin-4-one-2,2-dioxide from butanone-(2) and 2,4,6-trichloro-phenoxy-sulfonyl-isocyanate 50 ml. (81.8 g., 0.27 mol) of 2,4,6-trichloro-phenoxy-sulfonyl-isocyanate were added dropwise at 20–30° C. to 100 ml. (80.5 g., 1.12 mol) of butanone-(2), and the whole was allowed to react overnight. After distilling off the excess butanone, 110 g. of a semicrystalline fair substance were obtained, which was dissolved in 100 ml. of methylene chloride, and the whole was stirred for 2 hours at 30–35° C. with 100 ml. of water and 110 ml. of 5 N NaOH. After cooling, the methylene chloride was separated, the alkaline solution was acidified with 60 ml. of concentrated hydrochloric acid, and extracted with ethyl acetate. The strongly acidic oxathiazinone derivative was separated by stirring with 25 g. of sodium hydrogen carbonate and 200 ml. of water, and the trichlorophenol was eliminated by extraction with 125 ml. of 2 N NaOH from the organic phase which contained 2,4,6-trichlorophenol as well as 5,6-dimethyl-3,4-dihydro-1,2,3-oxathiazin-4-one-2,2-dioxide.

Yield: 33 g. (0.187 mol)=69% of the theoretical yield of the oxathiazinone derivative having a melting point of 105–106° C., and 46 g. (0.233 mol)=86% of the theoretical yield of trichlorophenol having a melting point of 67–69° C.

Both products were identified by establishing the mixed melting point and comparing the IR spectra. The purity of the oxathiazinone derivative was controlled by gas chromatography on a polyphenyl ether separation column (70–250° C.) (as solution in chloroform).

EXAMPLE 4

Preparation of 5,6-dimethyl-3,4-dihydro-1,2,3-oxathiazin-4-one - 2,2 - dioxide from butanone-(2) and p-chlorophenoxy-sulfonyl-isocyanate 100 ml. of butanone-(2) were stirred with 50 ml. (0.31 mol) of p-chlorophenoxy-sulfonyl-isocyanate, while the temperature was rising from 22° C. to 35° C. After the mixture had been allowed to stand for 20 hours, the isocyanate was converted totally (IR control at 4.4μ). After distilling off the butanone in vacuo, 98 g. of an orange coloured oil were obtained which, after dilution with 100 ml. of chloroform, was combined with 150 ml. of 4 N NaOH and then heated to about 50° C. for 4 hours. After a work-up as described in Example 3 and the subsequent separation with sodium hydrogen carbonate or 2 N sodium hydroxide solution, besides 14 g. of p-chlorophenol having a boiling point at 40–43° C. at 0.2 torr and a melting point of 40° C. (43% of the theoretical yield), 12 g. of 5,6-dimethyl-3,4-dihydro-1,2,3 - oxathiazin-4-one-2,2-dioxide having a melting point of 105–107° C. were obtained.

EXAMPLE 5

Preparation of 5,6-dimethyl-3,4-dihydro-1,2,3-oxathiazin-4-one-2,2-dioxide from butanone-(2) and p - cyanophenoxy-sulfonyl-isocyanate A mixture of 100 ml. of butanone-(2) (1.12 mol) and 67 g. of p-cyano-phenoxy-sulfonyl-isocyanate (0.3 mol) was heated for 2 hours at 45° C. The reaction was then complete (disappearance of the N=C=O band in the IR spectrum). After distilling off the excess butanone in vacuo, 88 g. of a fair oil was obtained as residue.

For saponification purposes, this oil was dissolved in 300 ml. of 2 N NaOH and heated for 3 hours to 45° C. After the work-up as described in Example 3 and the subsequent separation, 11 g. of 5,6-dimethyl-3,4-dihydro-1,2,3-oxathiazin-4-one-2,2-dioxide having a melting point of 105–107° C. were obtained.

We claim:
1. A process for the preparation of a compound of the formula

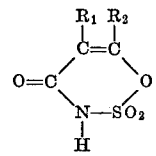

in which R₁ is hydrogen, alkyl of 1 to 20 carbon atoms or an aromatic hydrocarbon residue of up to 10 carbon atoms and R₂ is alkyl of 1 to 20 carbon atoms or an aromatic hydrocarbon residue of up to 10 carbon atoms, and its salts, which comprises reacting a compound of the formula

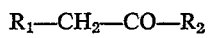

in which R₁ and R₂ are as defined above, with a compound of the formula

in which R is an aromatic radical of the benzene series, and treating the so-obtained intermediate of the formula

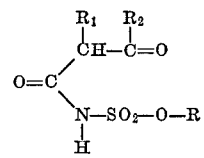

in which R, R₁ and R₂ are as defined above, with an aqueous alkaline agent at a temperature of about +5° C. to about +85° C. and in a pH range of about 5 to about 12.

2. The process as claimed in claim 1, wherein R is a group of the formula
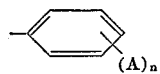
in which A is hydrogen, alkyl of 1 to 4 carbon atoms, fluorine, chlorine, bromine, cyano, rhodanido or nitro and $n$ is an integer of 1 to 3.
References Cited
UNITED STATES PATENTS
3,317,523   5/1967   Wright _____ 260—243
JOHN M. FORD, Primary Examiner
U.S. Cl. X.R.
99—141 A; 260—456 A